US011255735B2

(12) United States Patent
Engelstad et al.

(10) Patent No.: US 11,255,735 B2
(45) Date of Patent: Feb. 22, 2022

(54) SENSOR/TRANSMITTER PLUG-AND-PLAY FOR PROCESS INSTRUMENTATION

(71) Applicant: Rosemount Inc., Eden Prairie, MN (US)

(72) Inventors: Loren Michael Engelstad, Norwood, MN (US); Douglas Wayne Arnston, Maple Grove, MN (US); Jason Harold Rud, Mayer, MN (US); Clarence Edward Holmstadt, Chaska, MN (US); Randy Kenneth Paschke, Chaska, MN (US); Sergey Viktorovich Asmolov, Chelyabinsk (RU); Yury Mickolaevich Kuznetsov, Snezhinsk (RU)

(73) Assignee: ROSEMOUNT INC., Eden Prairie, MN (US)

( * ) Notice: Subject to any disclaimer, the term of this patent is extended or adjusted under 35 U.S.C. 154(b) by 1196 days.

(21) Appl. No.: 15/290,757

(22) Filed: Oct. 11, 2016

(65) Prior Publication Data
US 2017/0030783 A1   Feb. 2, 2017

Related U.S. Application Data

(63) Continuation of application No. 12/734,832, filed as application No. PCT/RU2009/000558 on Oct. 21, 2009, now abandoned.
(Continued)

(51) Int. Cl.
*G01K 19/00* (2006.01)
*G01D 3/02* (2006.01)
(Continued)

(52) U.S. Cl.
CPC .............. *G01K 19/00* (2013.01); *G01D 3/022* (2013.01); *G01K 1/022* (2013.01); *G01K 1/024* (2013.01); *G01K 7/021* (2013.01); *G01K 7/20* (2013.01)

(58) Field of Classification Search
CPC .......... G01K 19/00; H04Q 5/22; G01N 27/26; H04L 23/00
(Continued)

(56) References Cited

U.S. PATENT DOCUMENTS

| 4,608,532 A | 8/1986 | Ibar et al. |
| 5,162,725 A | 11/1992 | Hodson et al. |

(Continued)

FOREIGN PATENT DOCUMENTS

| DE | 102006005632 A1 | 8/2007 |
| DE | 102007102992 B3 | 8/2008 |

(Continued)

OTHER PUBLICATIONS

European Office Action, for European Patent Application No. 09796844.0, dated Sep. 14, 2017, 5 pages.
(Continued)

*Primary Examiner* — Nam V Nguyen
(74) *Attorney, Agent, or Firm* — Kinney & Lange, P.A.

(57) ABSTRACT

A sensor assembly with a sensing element sends a sensor signal from the sensing element to attached process transmitter over sensor connection wires. The sensor assembly has memory circuitry for storing information related to the sensor assembly and interface circuitry that provides for digital communication of the stored information with the attached process transmitter. This digital communication is sent over the sensor connection wires.

31 Claims, 9 Drawing Sheets

Related U.S. Application Data

(60) Provisional application No. 61/107,533, filed on Oct. 22, 2008.

(51) Int. Cl.
*G01K 1/022* (2021.01)
*G01K 7/02* (2021.01)
*G01K 7/20* (2006.01)
*G01K 1/024* (2021.01)

(58) Field of Classification Search
USPC ........... 340/10.1–10.5, 665, 686, 632, 573.1; 324/115, 103; 702/138, 155
See application file for complete search history.

(56) References Cited

U.S. PATENT DOCUMENTS

| | | | |
|---|---|---|---|
| 5,245,333 A | 9/1993 | Anderson et al. | |
| 5,535,752 A * | 7/1996 | Halperin | A61B 5/0215 600/483 |
| 5,621,669 A * | 4/1997 | Bjornsson | A01G 25/167 239/63 |
| 5,754,596 A * | 5/1998 | Bischoff | G05B 19/0423 340/10.1 |
| 5,764,928 A | 6/1998 | Lanctot | |
| 5,870,695 A | 2/1999 | Brown et al. | |
| 5,907,491 A * | 5/1999 | Canada | G01H 1/003 340/3.1 |
| 5,948,962 A | 9/1999 | Matthiessen | |
| 6,005,500 A * | 12/1999 | Gaboury | H03M 3/46 341/118 |
| 6,013,108 A * | 1/2000 | Karolys | G01D 3/022 702/122 |
| 6,137,403 A | 10/2000 | Desrochers et al. | |
| 6,484,107 B1 | 11/2002 | Roper et al. | |
| 6,559,653 B2 * | 5/2003 | Macke, Sr. | H03K 17/94 324/555 |
| 6,568,279 B2 | 5/2003 | Behm et al. | |
| 6,617,963 B1 | 9/2003 | Watters et al. | |
| 6,701,274 B1 * | 3/2004 | Eryurek | G01D 3/022 702/130 |
| 6,799,195 B1 | 9/2004 | Thibault et al. | |
| 6,907,790 B2 | 6/2005 | Orth et al. | |
| 7,020,532 B2 | 3/2006 | Johnson et al. | |
| 7,258,021 B2 | 8/2007 | Broden | |
| 7,366,624 B2 | 4/2008 | Wobschall | |
| 7,373,356 B2 | 5/2008 | Potter et al. | |
| 7,421,321 B2 | 9/2008 | Breed et al. | |
| 7,496,473 B2 | 2/2009 | Lenz et al. | |
| 7,523,667 B2 | 4/2009 | Brown et al. | |
| 7,525,419 B2 * | 4/2009 | Orth | G01D 18/008 340/506 |
| 7,773,715 B2 * | 8/2010 | Westfield | G01D 3/08 340/870.16 |
| 7,786,867 B2 | 8/2010 | Hamel et al. | |
| 7,978,081 B2 | 7/2011 | Shears et al. | |
| 7,986,218 B2 | 7/2011 | Watters et al. | |
| 8,457,734 B2 | 6/2013 | Libbus et al. | |
| 2003/0069713 A1 | 4/2003 | Friedl et al. | |
| 2006/0149434 A1 | 7/2006 | Bertosa et al. | |
| 2006/0254911 A1 * | 11/2006 | Lindmueller | G01N 33/0062 204/424 |
| 2008/0027586 A1 | 1/2008 | Hern et al. | |
| 2008/0079444 A1 | 4/2008 | Denison | |

FOREIGN PATENT DOCUMENTS

| | | |
|---|---|---|
| EP | 0348758 | 1/1990 |
| EP | 0717869 | 6/1996 |
| EP | 0830646 | 3/1998 |
| EP | 1302755 A1 | 1/2003 |
| JP | H07115392 A | 5/1995 |
| WO | 1996010229 | 4/1996 |

OTHER PUBLICATIONS

English translation of Japanese Office Action dated Oct. 7, 2015, for corresponding Japanese Patent Application No. 2011-533135.
English translation of Japanese Office Action dated Mar. 18, 2015, for corresponding Japanese Patent Application No. 2013/533135.
Official Action of ROSPATENT for corresponding Russian Patent Application No. 2011120434/28(030294), dated Oct. 14, 2011.
International Search Report and Written Opinion of the European Patent Office in counterpart foreign application No. PCT/RU2009/000558.
Notification Regarding Results of Examination on Patentability, dated Feb. 27, 2014, for Russian Patent Application No. 2011120434.

* cited by examiner

SENSOR/TRANSMITTER PLUG-AND-PLAY FOR PROCESS INSTRUMENTATION

CROSS-REFERENCE TO RELATED APPLICATION

This application is a continuation of U.S. application Ser. No. 12/734,832, filed May 26, 2010, now abandoned, which is a United States national phase entry of PCT International Application No. PCT/RU2009/000558, filed on Oct. 21, 2009, which claims priority to U.S. Provisional Application No. 61/107,533 filed on Oct. 22, 2008, and entitled "Sensor/Transmitter "Plug-and-Play" For Process Instrumentation," the disclosure of which is incorporated by reference in its entirety.

BACKGROUND

The present invention relates to industrial process transmitters and sensors. In particular, the invention relates to the configuration of a process transmitter with information specific to an attached sensor assembly.

Industrial process transmitters and sensors are used to sense various characteristics of fluids flowing through a conduit or contained within a vessel and transmit information about those process characteristics to a control, monitoring and/or safety system remotely located from the process measurement. A sensor assembly generally includes a sensor, sensor wires, isolating materials and installation fittings. The sensor assembly senses a process parameter including pressure, temperature, pH or flow rate. A process transmitter electrically connected to the sensor assembly by the sensor wires receives a sensor output signal from the sensor assembly. The transmitter reads the sensor output signal received from the sensor assembly and converts it to information accurately representing the process parameter. Finally, the transmitter sends the information to the control system.

The accurate conversion of the sensor output signal by the transmitter to useful information depends on the transmitter having information about the characteristics of the sensor assembly, including the range of the sensor, calibration coefficients unique to the particular sensor module, and the sensor serial number. Storing this sensor-specific information in the transmitter is part of the process of configuring the transmitter. An improperly configured transmitter, with the wrong sensor assembly range or calibration coefficients, would send inaccurate process information to the control system.

For example, temperature transmitters typically require temperature sensor assembly information about the sensor class (Resistance Temperature Device (RTD) or thermocouple), connection (2, 3 or 4 wire), specific sensor type (platinum, K, J, etc.) and special calibrations, including Callendar-Van Dusen coefficients, to provide an accurate output. If the temperature sensor assembly is replaced, new coefficients must be loaded into the transmitter to maintain the accuracy of the transmitter output. Configuring the transmitter is a time-consuming process requiring the attachment of a separate electrical connection and manually loading the information into the transmitter. The manual nature of this configuration process makes it not only time consuming, but error prone as well. Great care must be taken in loading the information into the transmitter. The accidental loading of the wrong information can often be detected, because the resulting output is so far from the expected result that it is obvious a configuration error has occurred. However, if the error is less extreme, a serious accuracy problem can be created without any warning to the user.

Recently, sensor assemblies have been developed with an internal memory. The internal memory of a sensor assembly so equipped contains all of the configuration information associated with that specific sensor assembly. When such a sensor assembly is connected to a transmitter that has the capability to read the sensor assembly memory, the configuration data is automatically loaded into the transmitter, eliminating configuration errors entirely. Sensor assemblies and transmitters with this capability often referred to as "plug-and-play."

A useful plug-and-play system must transfer the configuration information without disturbing the accuracy of the output signal from the sensor assembly. This is typically done by providing separate wiring for the sensor output signal and for the configuration information. Such an arrangement is called a mixed-mode interface, because the output signal from the sensor assembly is analog and the configuration information from the internal memory is digital. An industry standard, IEEE 1451.4, was developed to standardize the physical connections and information stored in plug-and-play devices. The standard specifies separate sensor and configuration information wiring, except for a small class of constant-current devices with internal amplifiers, including accelerometers. However, for the vast majority of sensor assemblies, including thermocouples, RTDs, pressure sensors, and pH sensors, the requirement of separate wiring adds significant cost and complexity to the manufacture and use of the plug-and-play sensor assembly.

SUMMARY

In one embodiment of the present invention, a sensor assembly with a sensing element sends a sensor signal from the sensing element to an attached process transmitter over sensor connection wires. The sensor assembly also has memory circuitry for storing information related to the sensor assembly. The sensor assembly has interface circuitry that provides for digital communication of the stored information to and from the attached process transmitter. This digital communication is sent over the sensor connection wires.

Another embodiment of the present invention includes a method of configuring a sensor assembly/process transmitter combination. A sensor assembly is connected to a process transmitter through sensor connection wires. A carrier signal is supplied from the process transmitter to the sensor assembly through the sensor connection wires. The carrier signal powers memory circuitry associated with the sensor assembly. The carrier signal is modulated based upon configuration data of the sensor assembly stored by the memory circuitry to produce a modulated carrier signal containing the configuration data. The modulated carrier signal is demodulated to obtain the configuration data. The process transmitter is configured based upon the configuration data.

DETAILED DESCRIPTION

Figure 1A:
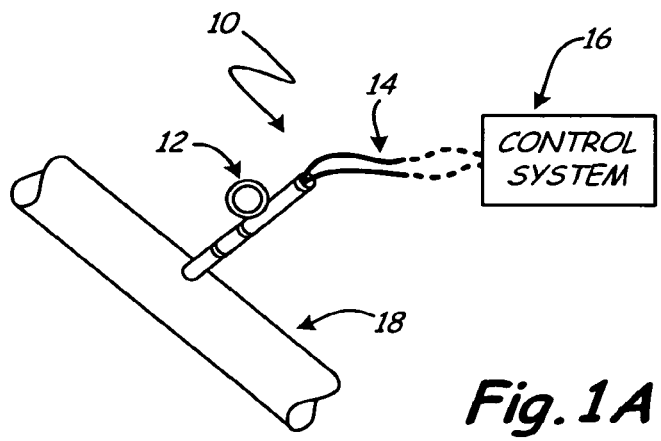
FIG. 1A shows a process control system including a temperature transmitter.
Figure 1B:
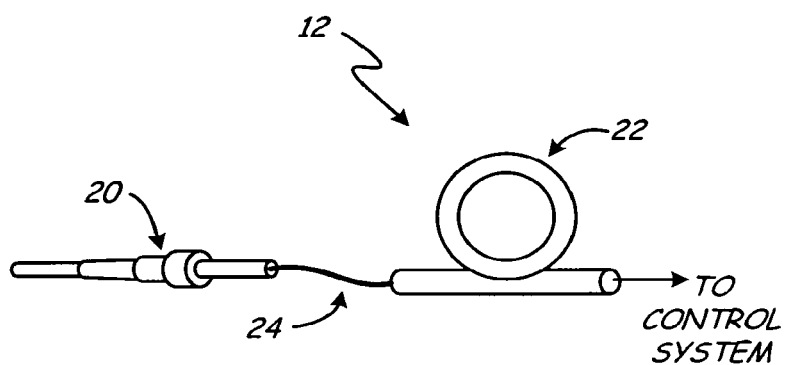
FIG. 1B shows an exploded view of a temperature measurement system.

FIGS. 1A and 1B are diagrams illustrating a process measurement or control system well known in the art.

FIG. 1A is a diagram illustrating process measurement or control system 10, including sensor assembly/process transmitter 12, control system 16, transmission line 14, and process piping 18. Sensor assembly/process transmitters can measure any of a number of process characteristics. In this embodiment, sensor assembly/process transmitter 12 measures temperature. Control system 16 may use measured temperature information for a variety of purposes, including making a record of the measurement, providing control instructions to control elements based on the information, or reporting the measurement to another measurement or control system. Transmission line 14 can be a multi-wire cable, fiber optic cable, or a wireless connection. Process piping 18 may also be any of a number of process vessels including a process tank, storage tank, distillation column, or reactor. Sensor assembly/process transmitter 12 is mounted on process piping 18 and connected to control system 16 by transmission line 14. Sensor assembly/process transmitter 12 measures the temperature in process piping 18 and sends (or transmits) an output signal over transmission line 14 to control system 16 representing the measured temperature in process piping 18. Process measurement or control system 10 can measure a process temperature and use the information for the purpose of process measurement or control.

FIG. 1B shows the major components of sensor assembly/process transmitter 12, including temperature sensor assembly 20, temperature process transmitter 22, and sensor wires 24. Temperature sensor assembly 20 can use one of any of several types of temperature sensing technologies, including thermocouples and RTDs with 2-wire, 3-wire, or 4-wire configurations. Temperature process transmitter 22 operates with any of the varieties of temperature sensor assembly 20 if configuration data associated with the specific temperature sensor assembly 20 is stored within the temperature process transmitter 22. Temperature sensor assembly 20 is connected to temperature process transmitter 22 by sensor wires 24.

Temperature sensor assembly 20 senses temperature and communicates an analog sensor signal representing the temperature sensed to temperature process transmitter 22 over sensor wires 24. Temperature process transmitter 22 digitizes and adjusts the analog sensor signal based on the configuration data stored within the temperature process transmitter 22 before transmitting the temperature information to a control system (not shown).

The accurate loading of the configuration data into temperature process transmitter 22 is essential, but as a manual process, is error prone and time consuming. Automatic loading of the configuration data from a memory location that is part of temperature sensor assembly 20 (plug-and-play) is advantageous, but at present, can only be done with another set of wires separate from sensor wires 24. The cost and complexity of dealing with an extra set of wires is a strong disincentive to the widespread adoption of this approach. The present invention overcomes this problem by providing plug-and-play functionality using only sensor wires 24.

Figure 2:
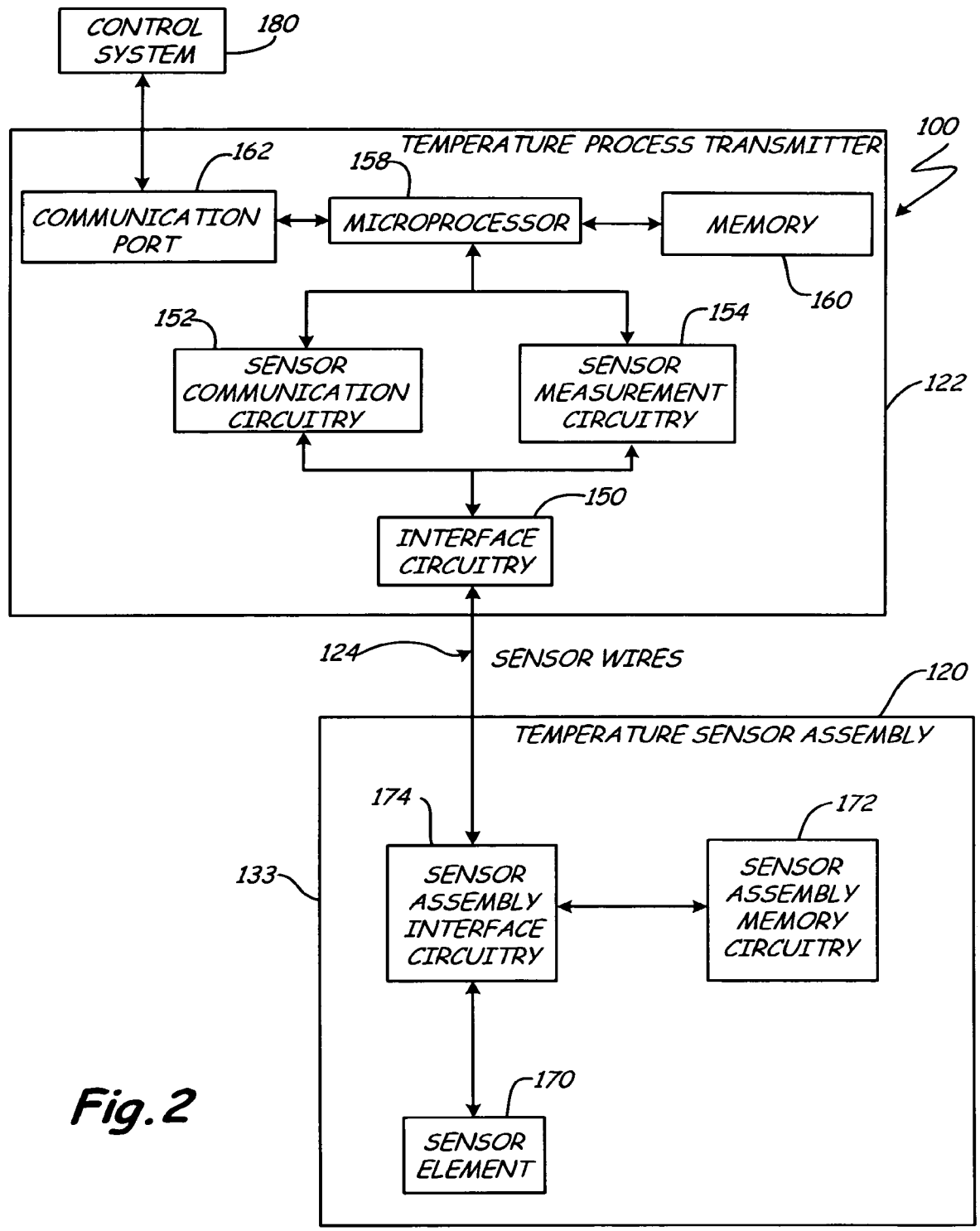
FIG. 2 is a diagram of a temperature transmitter and temperature sensor assembly capable of sensor measurement and sensor communication, including automatic configuration of the temperature transmitter.

FIG. 2 is a diagram that illustrates a sensor assembly/process transmitter 100 incorporating the present invention, capable of both sensor communication and sensor measurement over the same sensor wires. As shown in FIG. 2, sensor assembly/process transmitter 100 includes temperature sensor assembly 120, temperature process transmitter 122, and sensor wires 124. Temperature process transmitter 122, includes interface circuitry 150, sensor communication circuitry 152, sensor measurement circuitry 154, microprocessor 158, memory 160, and communication port 162. Temperature sensor assembly 120 includes sensor element 170, memory circuitry 172, and interface circuitry 174. FIG. 2 also shows control system 180.

Temperature sensor assembly 120 is connected to temperature process transmitter 122 by sensor wires 124. Sensor wires 124 attach to temperature process transmitter 122 at interface circuitry 150. Interface circuitry 150 connects to sensor communication circuitry 152 and to sensor measurement circuitry 154. Sensor communication circuitry 152 and sensor measurement circuitry 154 connect to microprocessor 158. Microprocessor 158 connects to memory 160 and to communication port 162. Communications port 162 connects to control system 180.

Sensor wires 124 also attach to temperature sensor assembly 120 at interface circuitry 174. Interface circuitry 174 is connected to sensor element 170 and to memory circuitry 172.

When temperature process transmitter 122 is powered up, manually signaled, or temperature sensor assembly 120 is connected to temperature process transmitter 122 by sensor wires 124 following a period of disconnection, microprocessor 158 signals sensor communication circuitry 152 to obtain configuration data from temperature sensor assembly 120. Sensor communication circuitry 152 sends a digital communication signal to obtain the configuration data to interface circuitry 150. Interface circuitry 150 sends the digital communication signal over sensor wires 124 to interface circuitry 174. Interface circuitry 174, obtains the configuration data from memory circuitry 172 and returns a digital communication signal containing the configuration data to sensor wires 124. Sensor wires 124 send the digital communication signal to interface circuitry 150. Interface circuitry 150 directs the digital communication signal to sensor communication circuitry 152. Communication circuitry 152 obtains the configuration data from the communication signal and sends this to microprocessor 158. Microprocessor 158 stores the configuration data in memory 160.

Once temperature process transmitter 122 has the configuration data for temperature sensor assembly 120, sensor element 170 senses temperature and communicates an analog sensor signal representing the temperature sensed to interface circuitry 174. Interface circuitry 174 passes the analog sensor signal unchanged on to sensor wires 124. Sensor wires 124 carry the sensor signal to interface circuitry 150. Interface circuitry 150 directs the sensor signal to sensor measurement circuitry 154 where the analog sensor signal is converted into a digital sensor signal. The digital sensor signal is directed to microprocessor 158 where it is adjusted to reflect an accurate temperature measurement, based on configuration data that microprocessor 158 retrieves from memory 160. Microprocessor 158 then sends the accurate temperature measurement to communication port 162 where it is transmitted to control system 180.

The present invention illustrated in FIG. 2 provides automatic loading of the configuration data for temperature sensor assembly 120 into temperature process transmitter 122. Further, the automatic configuration of temperature process transmitter 122 occurs over the same wiring used to transfer sensor data, sensor wires 124. No additional wiring is needed, providing true plug-and-play functionality.

The invention shown in FIG. 2 can also store and retrieve other types of sensor assembly related information, beyond retrieving configuration data, because the digital communication is two-way. Instead of requesting configuration data, microprocessor 158 can signal sensor communication circuitry 152 to store other data in temperature sensor assembly 120. Sensor communication circuitry 152 sends a digital communication signal to store the other data to interface circuitry 150. Interface circuitry 150 sends the digital communication signal over sensor wires 124 to interface circuitry 174. Interface circuitry 174 stores the other data in memory circuitry 172. Later, other data stored can be retrieved as needed by microprocessor 158 using the process described above for retrieving configuration data. Other data could include, for example, revised calibration coefficients, hours of use, and installation date.

Figure 3A:
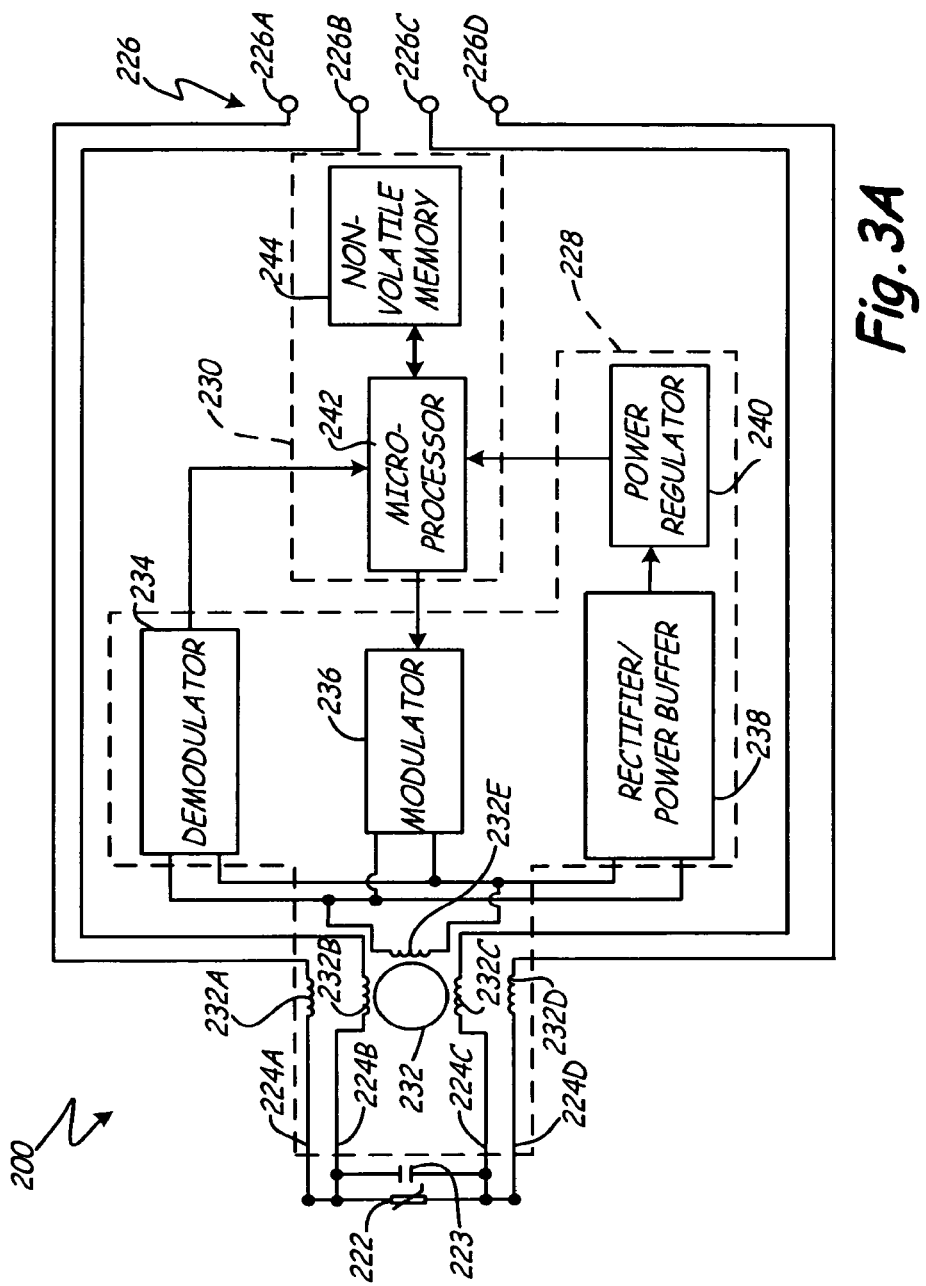
FIGS. 3A and 3B are diagrams of a temperature sensor assembly capable of sensor communication and sensor measurement compatible with a 2, 3, or 4-wire RTD or with a thermocouple, showing a 4-wire RTD and a 2-wire RTD, respectively.
Figure 3B:
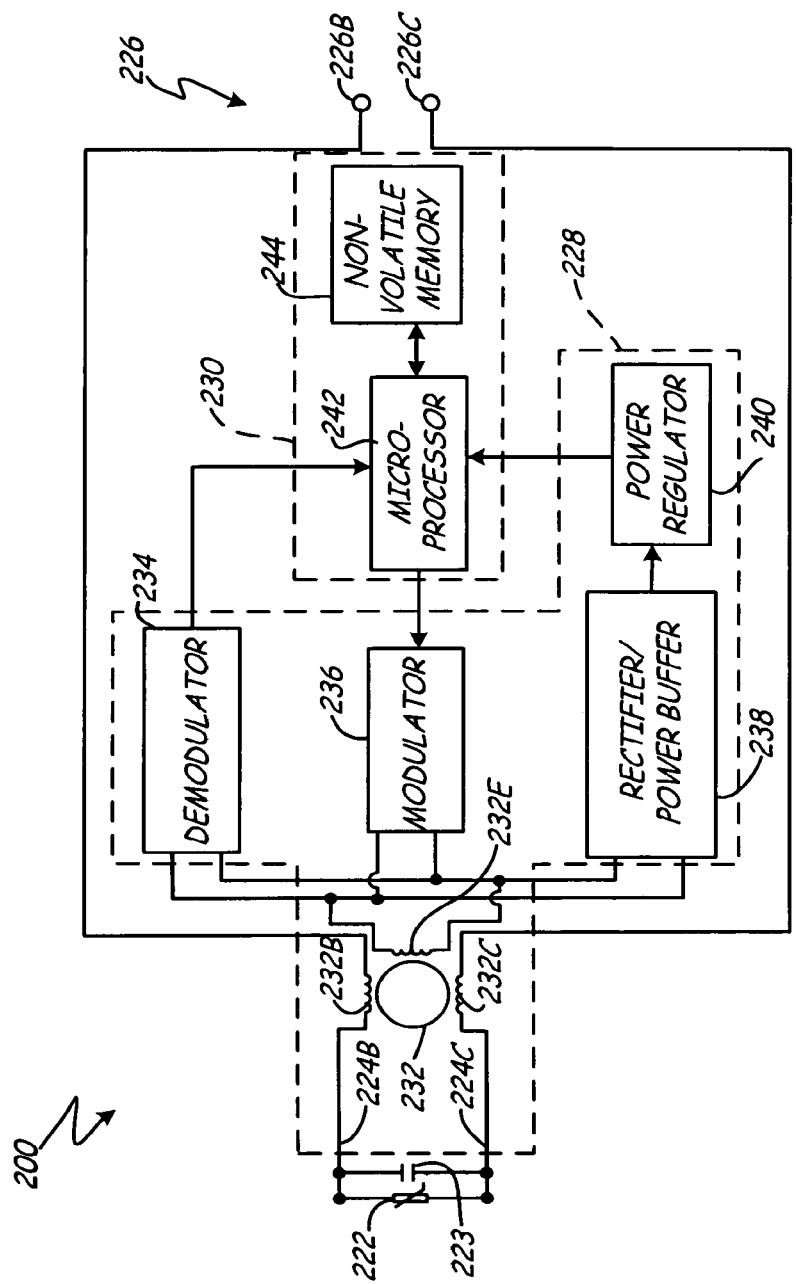

FIGS. 3A and 3B are diagrams illustrating the temperature sensor assembly portion of the invention capable of sensor communication and sensor measurement. The embodiments shown use a modulated carrier signal transmitted over sensor wires to read temperature sensor assembly information from, or store information in, sensor assembly memory circuitry and are compatible with 2, 3, or 4-wire RTD or with thermocouple sensor types. 4-wire RTD and 2-wire RTD configurations are illustrated in FIGS. 3A and 3B, respectively.

FIG. 3A shows a 4-wire RTD configuration. Temperature sensor assembly 200 includes RTD sensor element 222, bypass capacitor 223, sensor leads 224A to 224D, sensor wires 226A to 226D, sensor assembly interface circuitry 228, and sensor assembly memory circuitry, 230. Sensor assembly interface circuitry 228 includes inductive coupling transformer 232, demodulator 234, modulator 236 rectifier/power buffer 238, and power regulator 240. Inductive coupling transformer 232 includes transformer windings 232A to 232E. Sensor assembly memory circuitry 230 includes microprocessor 242 and nonvolatile memory 244.

As shown in FIG. 3A, RTD sensor element 222 is connected to sensor leads 224A to 224D. Bypass capacitor 223 is connected to sensor leads 224B and 224C, in parallel with RTD sensor element 222. Transformer windings 232A to 232D are connected to sensor leads 224A to 224D and to sensor wires 226A to 226D. Sensor wires 226A to 226D connect to a temperature process transmitter. Transformer winding 232E connects to demodulator 234, modulator 236, and rectifier/power buffer 238. Rectifier/power buffer 238 connects to power regulator 240. Demodulator 234, modulator 236, and power regulator 240 connect to microprocessor 242. Microprocessor 242 connects to nonvolatile memory 244.

In typical operation, when no temperature sensor assembly information is to be stored in or retrieved from the sensor assembly memory circuitry and only a temperature measurement is needed, a voltage level is applied at sensor wire 226B from a temperature process transmitter. The voltage level conducts through transformer 232 via transformer winding 232B and sensor lead 224B to RTD sensor element 222. The voltage level changes across RTD sensor element 222 relative to the temperature-dependant resistance of RTD sensor element 222 resulting in a changed voltage level. The changed voltage level conducts through sensor lead 224C and back through transformer 232 via transformer winding 232C to sensor wire 226C which conducts the changed voltage level to the temperature process transmitter. The temperature process transmitter uses the change in voltage level to determine a temperature sensed by RTD sensor element 222.

If temperature sensor assembly information is to be retrieved from the sensor assembly memory circuitry, but no temperature measurement is needed, including when the temperature process transmitter is powered up, manually signaled, or temperature sensor assembly 200 is connected to the temperature process transmitter by sensor wires 226A to 226D following a period of disconnection, the temperature process transmitter sends a carrier signal to sensor wire 226B. The carrier signal propagates to transformer winding 232B where transformer winding 232E receives the carrier signal by induction across transformer 232. The carrier signal propagates to rectifier/power buffer 238, where the alternating voltage of the carrier signal is rectified, doubled, and used to charge a storage capacitor. Charging and discharging of the storage capacitor is controlled by power regulator 240. When sufficient power has been accumulated by rectifier/power buffer 238, power regulator 240 provides the power to microprocessor 242.

Microprocessor 242 retrieves previously stored information related to temperature sensor assembly 200, including configuration data, from nonvolatile memory 244 and sends this digital information to modulator 236. Modulator 236 modulates the carrier signal to encode the digital information by induction from transformer winding 232E, across transformer 232, to transformer winding 232C. The modulated carrier signal propagates from transformer winding 232C to sensor wire 226C, which conducts the modulated carrier signal to the temperature process transmitter, providing the temperature process transmitter with the previously stored information related to temperature sensor assembly 200. If the previously stored information related to temperature sensor assembly 200 to be sent is more than that which can be retrieved and sent by microprocessor 242 with the power that can be accumulated at one time by rectifier/power buffer 238, a portion of the previously stored information related to temperature sensor assembly 200 is sent, then power is accumulated again by rectifier/power buffer 238, and then another portion of the previously stored information related to temperature sensor assembly 200. The process is repeated as necessary to send the previously stored information related to temperature sensor assembly 200, including configuration data.

If temperature sensor assembly information is to be stored in or retrieved from the sensor assembly memory circuitry and a temperature measurement is needed simultaneously, the temperature process transmitter sends a carrier signal at an average voltage level to sensor wire 226B. The carrier signal propagates through transformer 232 via transformer winding 232B and sensor lead 224B to RTD sensor element 222. The average voltage level of the carrier signal changes across RTD sensor element 222 relative to its temperature-dependant resistance and a changed carrier signal propagates through sensor lead 224C and back through transformer 232 via transformer winding 232C to sensor wire 226C which conducts the changed carrier signal to the temperature process transmitter. The temperature process transmitter uses the change in the average voltage level of the carrier signal to determine a temperature sensed by RTD sensor element 222.

Simultaneously, transformer winding 232E receives the carrier signal from the temperature process transmitter by induction from transformer winding 232B across transformer 232. If sending instructions to, or storing information in, temperature sensor assembly 200, the carrier signal will be a modulated carrier signal containing digital information encoded in the modulation Like the unmodulated carrier signal described above, the modulated carrier signal also provides power to rectifier/power buffer 238 for use by microprocessor 240. The modulated carrier signal propagates to demodulator 234 where it is demodulated. Demodulator 234 sends the demodulated digital information, including configuration data, to microprocessor 242. Microprocessor 242 executes any instructions contained in the digital information received or stores the digital information received in nonvolatile memory 244. Execution of instructions or storage of the digital information may proceed in steps as power is accumulated by rectifier/power buffer 238 and used by microprocessor 242.

When instructed by the temperature process transmitter, microprocessor 242 retrieves information from nonvolatile memory 244 and sends this digital information to modulator 236. Once the instruction has been sent by the temperature process transmitter, modulation of the modulated carrier signal by the temperature process transmitter is suspended and only the carrier signal is sent to temperature sensor assembly 200. Modulator 236 modulates the carrier signal to encode the digital information by induction from transformer winding 232E, across transformer 232, to transformer winding 232C. The modulated carrier signal propagates from transformer winding 232C to sensor wire 226C, which conducts the modulated carrier signal to the temperature process transmitter, providing the temperature process transmitter with the previously stored information.

The embodiment shown in FIG. 3A provides for reading information from, and storing information in, a memory location within a temperature sensor assembly while maintaining an accurate temperature sensor signal without the use of wires separate from those carrying the sensor signal. The use of a modulated carrier signal transmitted over the sensor wires provides both two-way digital communication and power for the related temperature sensor assembly circuitry. Temperature sensor assemblies so equipped, when attached to a temperature process transmitter with compatible capabilities, are truly plug-and-play.

As shown in FIG. 3A, all sensor wires 226A to 226D are attached to transformer windings 232A to 232D, but only sensor wires 226B and 226C actually need to inductively couple to transformer 232 for reading and storing information. However, inductively coupling all four wires to the transformer provides maximum flexibility in manufacturing and using the invention. When wiring to the temperature process transmitter, sensor wires 226A and 226B are interchangeable as are sensor wires 226C and 226D. Ideally, sensor wires 226A to 226D, transformer windings 232A to 232D, and sensor leads 224A to 224D are all made of the same material to eliminate the creation of thermocouple junctions between dissimilar metals. However, it is reasonable to use copper wire for transformer windings 232A to 232D because the close proximity of all junctions leads to nearly isothermal conditions; thus any voltages generated across the junctions will be mutually compensated.

While FIG. 3A illustrates the arrangement using a 4-wire RTD configuration, those skilled in the art will appreciate that 2- and 3-wire RTD and thermocouple sensor types can be also be used and the corresponding sensor leads, transformer windings and sensor lines omitted. RTDs require high-frequency bypass capacitor 223 between sensor leads 224B and 224C used to propagate the carrier signal, when, as shown in FIG. 3A, sensor leads 224B and 224C are on opposite sides of the RTD sensor element 222. Bypass capacitor 223 conducts the carrier signal around RTD sensor element 222 and prevents the carrier signal from being so attenuated by RTD sensor element 222 that communication with the temperature process transmitter is not possible. Alternatively, for 3- and 4-wire RTD configurations, the carrier signal can be propagated by sensor wires on the same side of RTD sensor element 222, sensor wires 226A and 226B, for example. In such a case, bypass capacitor 223 can be omitted because the carrier signal does not pass across RTD sensor element 222.

FIG. 3B illustrates the unique arrangement when using a 2-wire RTD. In this configuration, unlike that in FIG. 3A, there are only two sensor wires 226B and 226C and no way to propagate the carrier signal around RTD sensor element 222. In the embodiment of FIG. 3B using a 2-wire RTD, bypass capacitor 223 is required to prevent unacceptable attenuation of the carrier signal.

The embodiments in FIGS. 3A and 3B illustrate the invention using a transformer to inductively couple the modulated carrier signal with temperature sensor assembly electronics. In addition, those skilled in the art will recognize that other devices, including antennae, can be used for inductive coupling. Capacitive coupling is yet another method suitable for coupling the modulated carrier signal within the temperature sensor assembly. In addition, power for microprocessor 242 may be provided by other means, including a long-life battery, thermionic power, and photoelectric power.

Figure 4A:
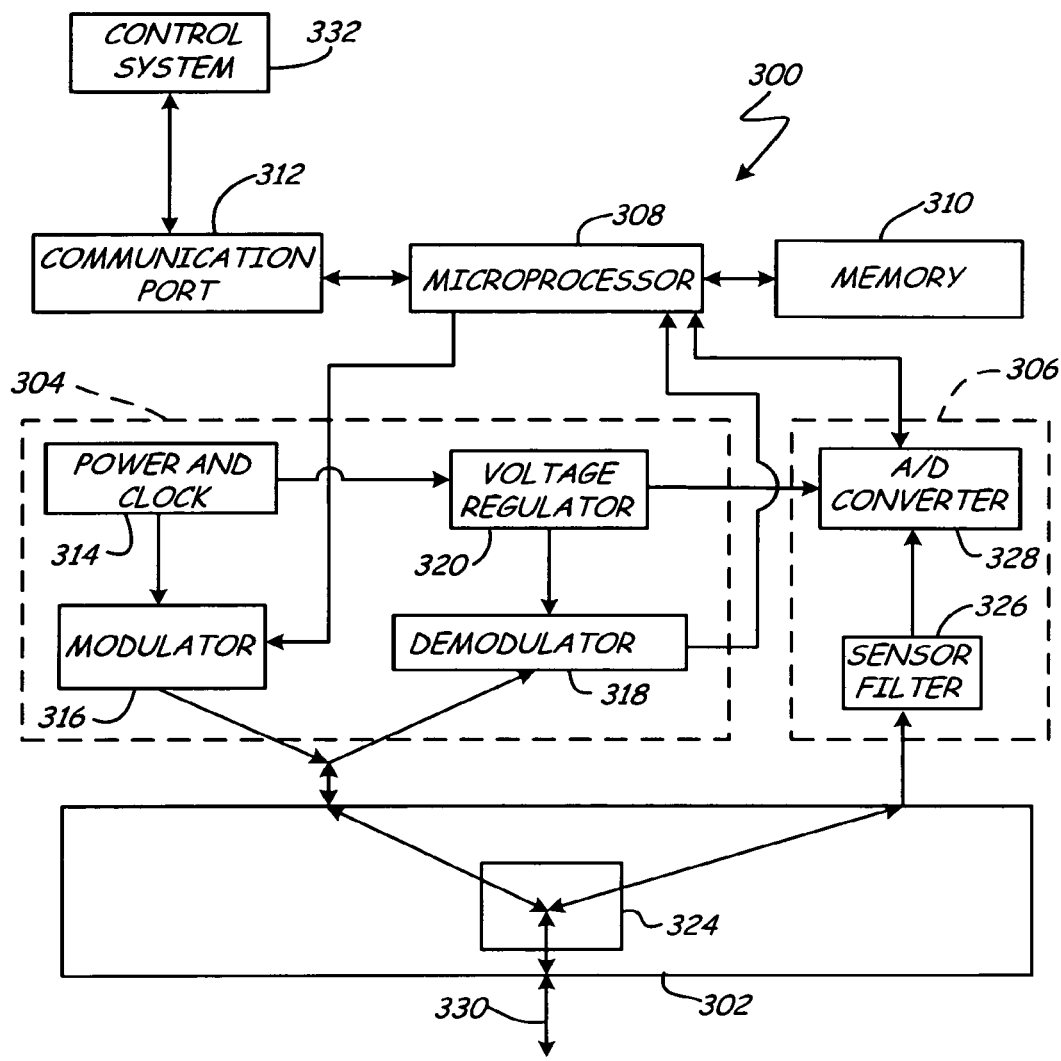
FIGS. 4A and 4B are diagrams of temperature process transmitters capable of sensor communication and sensor measurement.
Figure 4B:
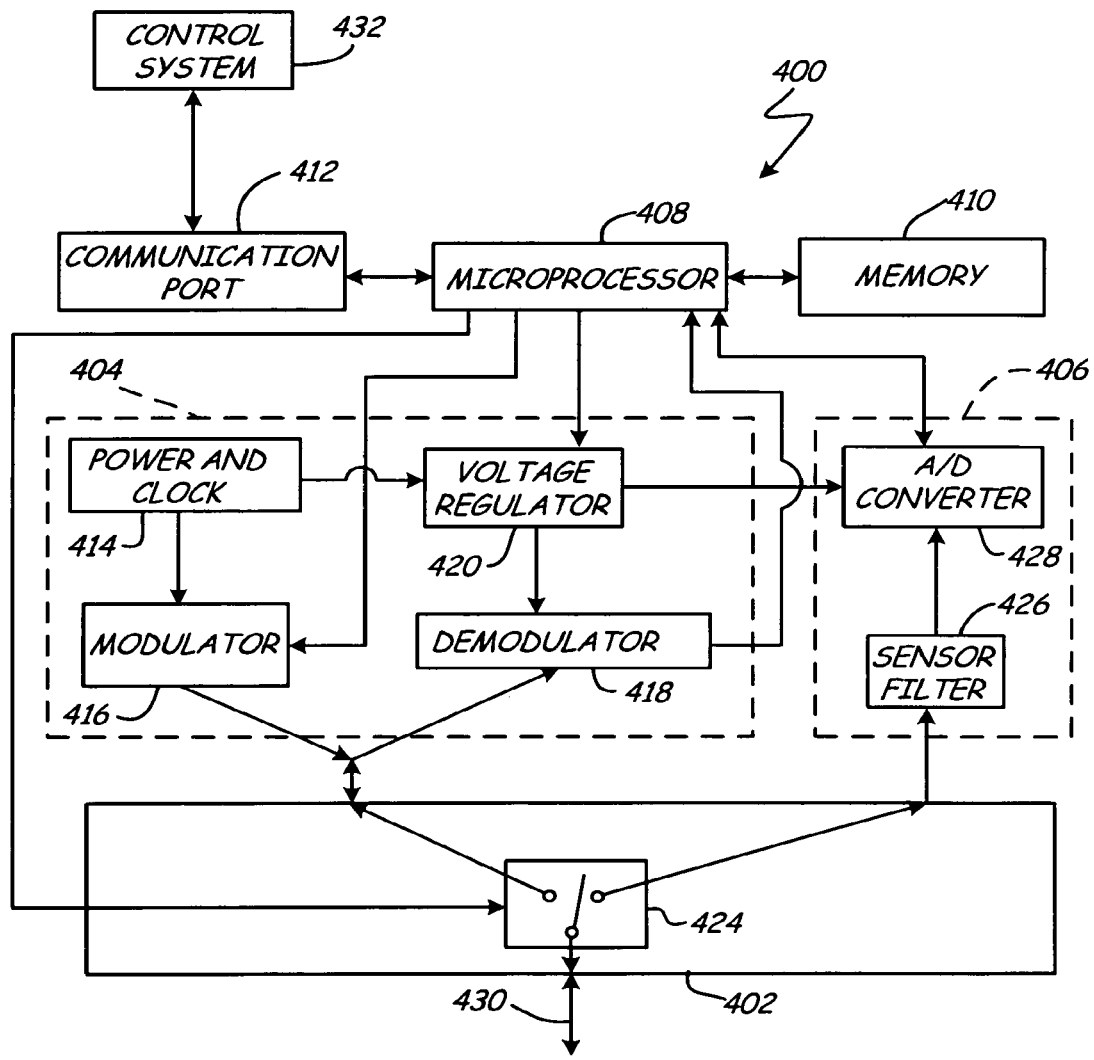

FIGS. 4A and 4B are diagrams that illustrate two variations of another embodiment of the temperature process transmitter portion of the invention, capable of both sensor communication and sensor measurement over the same sensor wires. The embodiments shown use a modulated carrier signal transmitted over sensor wires to read temperature sensor assembly information from, or store information in, sensor assembly memory circuitry (sensor communication) while also receiving an accurate temperature sensor signal over the same sensor wires (sensor measurement).

FIG. 4A illustrates temperature process transmitter 300, including interface circuitry 302, sensor communication circuitry 304, sensor measurement circuitry 306, microprocessor 308, memory 310, and communication port 312. Sensor communication circuitry 304 includes power and clock 314, modulator 316, demodulator 318, and voltage regulator 320. Interface circuitry 302 includes signal splitter 324. Sensor measurement circuitry 306 includes sensor filter 326 and A/D converter 328. FIG. 4A also shows sensor wires 330 and control system 332.

Sensor wires 330 from a temperature sensor assembly, attach to temperature process transmitter 300 at the interface circuitry 302. Within interface circuitry 302, sensor wires 330 are electrically connected to signal splitter 324. Signal splitter 324 is connected to modulator 316, demodulator 318, and sensor filter 326. Modulator 316 is connected to power and clock 314 and microprocessor 308. Demodulator 318 is connected to voltage regulator 320 and microprocessor 308. Voltage regulator 320 is connected to power and clock 314 and A/D converter 306. A/D converter 306 is connected to sensor filter 326 and microprocessor 308. Microprocessor 308 is connected to memory 310 and communication port 312. Communication port 312 is connected to control system 332.

The operation of temperature process transmitter 300 begins when power and clock 314 creates an alternating voltage carrier signal, at a voltage level. This signal is sent to modulator 316 where the carrier signal is modulated to digitally encode instructions or information, based on input from microprocessor 308. The modulated carrier signal at the voltage level propagates through signal splitter 324 and to the temperature sensor assembly by way of sensor wires 330. If no instructions or information are to be sent, the carrier signal at the voltage level propagates to the temperature sensor assembly in unmodulated form.

Temperature process transmitter 300 also receives a return carrier signal from the temperature sensor assembly at interface circuitry 302 from sensor wires 330. If the carrier signal at the voltage level was sent from temperature process transmitter 300 in unmodulated form, the temperature sensor assembly may have digitally encoded information, including configuration data, by modulating the return carrier signal, as described in the discussion of FIG. 2 above. In addition, the voltage level of the return carrier signal may have changed, also as described in the discussion of FIG. 2 above, creating an analog sensor signal containing temperature information. The return carrier signal received at interface circuitry 302 is split at signal splitter 324 and propagates to demodulator 318 and sensor filter 326.

If the return carrier signal contains digitally encoded information, including configuration data, from the temperature sensor assembly, demodulator, 318, demodulates the return modulated carrier signal. Demodulator 318 sends the demodulated digital information to microprocessor 308. Microprocessor 308 may store the digital information received, which may include configuration data, in memory 310 or may send it to communication port 312 where it is transmitted to control system 332.

Sensor filter 326 filters out high frequency voltage fluctuations associated with the return carrier signal, or other high frequency interference, and passes on the analog sensor signal to A/D converter 306. A/D converter 306 converts the analog sensor signal to a digital sensor signal and sends it to microprocessor 308. Microprocessor 308 retrieves the configuration data from memory 310 and adjusts the digital sensor signal, based on configuration data to reflect an accurate temperature measurement. Microprocessor 308 then sends the accurate temperature measurement to communication port 312 where it is transmitted to control system 332.

Voltage regulator 320 receives power from power and clock 314 and regulates it to provide power to both A/D converter 306 and demodulator 318.

The embodiment shown in FIG. 4A provides for reading information from, and storing information in, a memory location within a temperature sensor assembly while maintaining an accurate temperature sensor signal without the use of wires separate from those carrying the sensor signal. The use of a modulated carrier signal transmitted over the sensor wires provides both two-way digital communication and an accurate analog sensor signal. In addition, sensor communication and sensor measurement can take place at the same time. This is a key advantage for processes where even a short disruption in temperature measurement could not be tolerated.

In the embodiment illustrated in FIG. 4A, sensor measurement and sensor communication can take place at the same time. However, in some instances, including low power current loop applications or wireless transmitter applications, there may be only enough power for either sensor measurement or sensor communication. In the embodiment shown in FIG. 4B, sensor measurement and sensor communication each take place only during separate modes of operation, a measurement mode and a communication mode, respectively.

FIG. 4B illustrates temperature process transmitter 400, including interface circuitry 402, sensor communication circuitry 404, sensor measurement circuitry 406, microprocessor 408, memory 410, and communication port 412. Sensor communication circuitry 404 includes power and clock 414, modulator 416, demodulator 418 and voltage regulator 420. Interface circuitry 402 includes signal switch 424. Sensor measurement circuitry 406 includes sensor filter 426 and A/D converter 428. FIG. 4B also shows sensor wires 430 and control system 432.

Sensor wires 430 from a temperature sensor assembly, attach to temperature process transmitter 400 at the interface circuitry 402. Within interface circuitry 402, sensor wires 430 are electrically connected to signal switch 424, which is connected to modulator 416 and demodulator 418. Signal switch 424 is also connected to sensor filter 426, depending on switch position. Modulator 416 is connected to power and clock 414 and microprocessor 408. Demodulator 418 is connected to voltage regulator 420 and microprocessor 408. Voltage regulator 420 is connected to power and clock 414, to A/D converter 406 and microprocessor 408. A/D converter 406 is connected to sensor filter 426 and microprocessor 408. Microprocessor 408 is connected to signal switch 424, memory 410, and communication port 412. Communication port 412 is connected to control system 432.

Temperature process transmitter 400 initiates communication mode by shutting down sensor measurement circuitry 406. Microprocessor 408 directs voltage regulator 420 to shut off power to A/D converter 428. Microprocessor 408 also directs signal switch 424 to disconnect sensor wires 430 from sensor filter 426 and to connect sensor wires 430 to sensor communication circuitry 404. The change in signal switch 424 position disconnects all inputs to sensor filter 426 and consequently, to A/D converter 428. This shuts down power consumption by sensor measurement circuitry 406. An alternating voltage carrier signal created by power and clock 414 is sent to modulator 416 where the carrier signal is modulated to digitally encode instructions or information, based on input from microprocessor 408. The modulated carrier signal propagates through signal switch 424 and to the temperature sensor assembly by way of sensor wires 430. If no instructions or information are to be sent, the carrier signal propagates to the temperature sensor assembly in unmodulated form.

Temperature process transmitter 400 during communication mode also receives a return carrier signal from the temperature sensor assembly at interface circuitry 402 from sensor wires 430. If the carrier signal was sent from temperature process transmitter 400 in unmodulated form, the temperature sensor assembly will have digitally encoded information, including configuration data, by modulating the return carrier signal, as described in the discussion of FIG. 2 above. The return carrier signal received at interface circuitry 402 is directed by signal switch 424 to demodulator 418. Demodulator 418 demodulates the return modulated carrier signal. Demodulator 418 sends the demodulated digital information to microprocessor 408. Microprocessor 408 may store the digital information received, which may include configuration data, in memory 410 or may send it to communication port 412 where it is transmitted to control system 432.

Temperature process transmitter 400 initiates measurement mode by reactivating sensor measurement circuitry 406 and deactivating sensor communication circuitry 404. Microprocessor 408 directs voltage regulator 420 to connect power to A/D converter 428 and disconnect power to demodulator 418. Microprocessor 408 also directs signal switch 424 to disconnect sensor wires 430 from sensor communication circuitry 404 and to connect sensor wires 430 to sensor filter 426, and consequently, to A/D converter 428. Voltage regulator 420 receives power from power and clock 414 and regulates it to provide power to A/D converter 406.

Temperature process transmitter 400 during measurement mode receives an analog sensor signal from the temperature sensor assembly at interface circuitry 402 from sensor wires 430. The analog sensor signal contains temperature measurement information. The return analog sensor signal received at interface circuitry 402 is directed through signal switch 424 to sensor filter 426.

Sensor filter 426 filters out any high-frequency voltage fluctuations associated with the analog sensor signal and passes on the analog sensor signal to A/D converter 406. A/D converter 406 converts the analog sensor signal to a digital sensor signal and sends it to microprocessor 408. Microprocessor 408 retrieves the configuration data from memory 410 and adjusts the digital sensor signal, based on configuration data to reflect an accurate temperature measurement. Microprocessor 408 then sends the accurate temperature measurement to communication port 412 where it is transmitted to control system 432.

The embodiment shown in FIG. 4B provides for reading information from, and storing information in, a memory location within a temperature sensor assembly while maintaining an accurate temperature sensor signal without the use of wires separate from those carrying the sensor signal. The use of a modulated carrier signal transmitted over the sensor wires provides two-way digital communication. In addition, in the embodiment in FIG. 4B, sensor measurement and sensor communication each take place only during separate modes of operation: a measurement mode and a communication mode, respectively. This feature brings the advantages of plug-and-play to applications, including low power current loop applications or wireless transmitter applications, where there may be only enough power for either sensor measurement or sensor communication.

Figure 5:
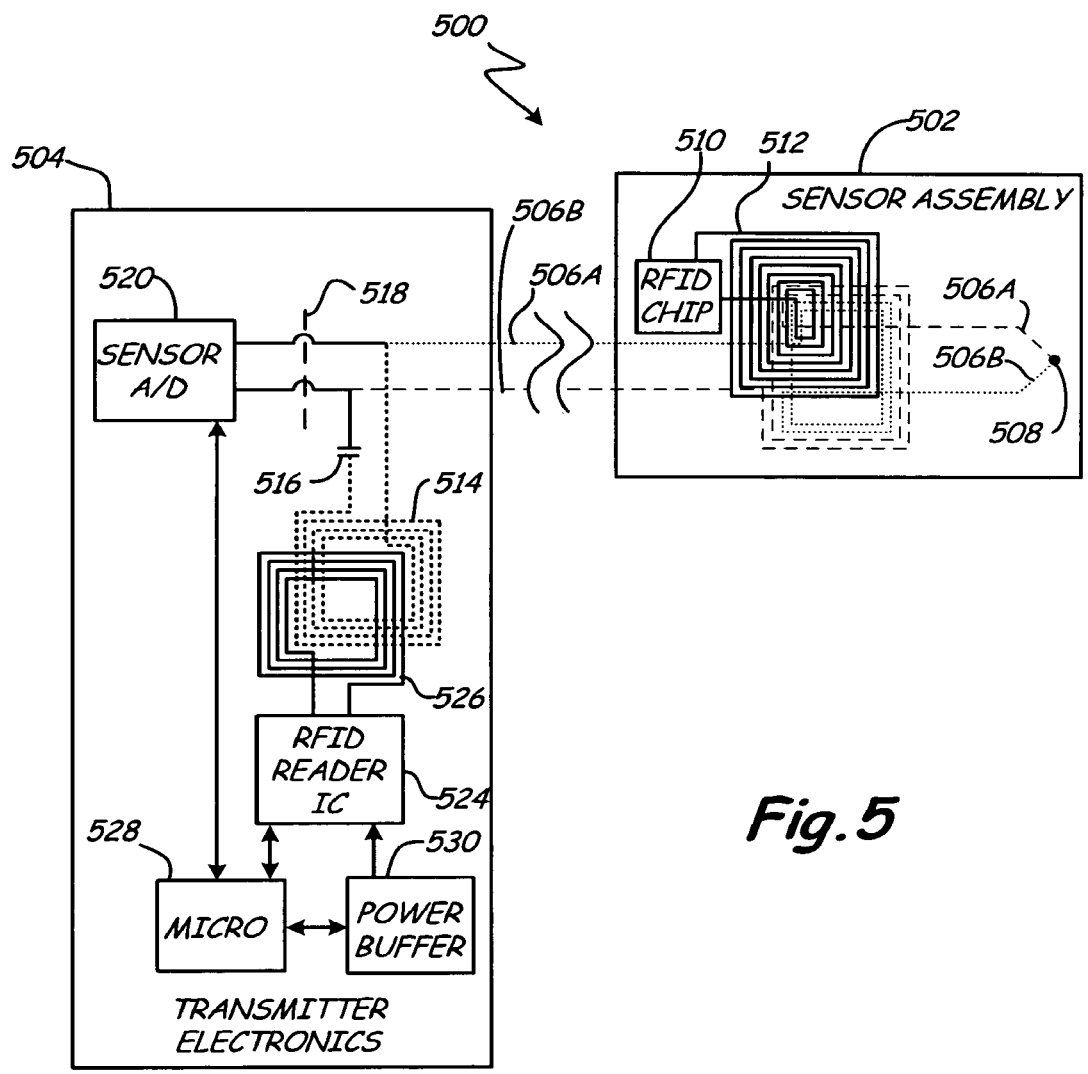
FIG. 5 is a diagram of a temperature process transmitter and temperature sensor assembly using RFID circuits and a thermocouple sensor element.

FIG. 5 is a diagram of a temperature process transmitter and temperature sensor assembly using RFID circuits. In this embodiment, antennae are used to inductively couple a modulated carrier signal with temperature sensor assembly electronics and with temperature process transmitter electronics. This arrangement provides for reading digital information from, and storing digital information in, a memory location on an RFID chip within a temperature sensor assembly while maintaining an accurate analog temperature sensor signal, without the use of wires separate from those carrying the sensor signal. The digital information read or stored can be configuration data. Transmitting the modulated carrier signal over the sensor wires propagates the RFID signal much farther than possible with conventional wireless RFID technology. This embodiment provides both two-way digital communication and an accurate analog sensor signal.

FIG. 5 illustrates temperature sensor assembly/temperature process transmitter 500, including temperature sensor assembly 502, temperature process transmitter 504, and sensor wires 506A and 506B. Temperature sensor assembly 502 includes thermocouple sensor element 508, RFID chip 510, and RFID chip antenna 512. Temperature process transmitter 504 includes transmitter antenna 514, blocking capacitor 516, sensor filter 518, A/D converter 520, RFID reader IC 524, RFID reader antenna 526, microprocessor 528, and power buffer 530.

As shown in FIG. 5, temperature sensor assembly 502 is connected to temperature process transmitter 504 by sensor wires 506A and 506B. Within temperature sensor assembly 502, sensor element 508 is connected to sensor wires 506A and 506B. Portions of sensor wires 506A and 506B, within temperature sensor assembly 502 are coiled proximate RFID chip antenna 512, which is connected to RFID chip 510.

Within temperature process transmitter 504, sensor wires 506A and 506B are connected to sensor filter 518 and one of either sensor wire 506A or 506B (sensor wire 506A illustrated) is connected to transmitter antenna 514 while the other one of either sensor wire 506A or 506B (sensor 506B illustrated) is connected to blocking capacitor 516, which is then connected to transmitter antenna 514. Transmitter antenna 514 is proximate RFID reader antenna 526, which is connected to RFID reader IC 524. RFID reader IC 524 is connected to microprocessor 528 and power buffer 530. Microprocessor 528 is connected to power buffer 530. Sensor filter 518 is connected to A/D converter 520.

When temperature process transmitter 504 is powered up, manually signaled, or temperature sensor assembly 502 connects to temperature process transmitter 504 by sensor wires 506A and 506 B following a period of disconnection, microprocessor 528 signals RFID reader IC 524 to request configuration data from temperature sensor assembly 502. RFID reader IC 524 generates a carrier signal, modulated to encode the request, and conducts the modulated carrier signal to RFID reader antenna 526. RFID reader antenna 526 transmits the modulated carrier signal to transmitter antenna 514 by induction across the small distance separating RFID reader antenna 526 from transmitter antenna 514. The modulated carrier signal propagates from transmitter antenna 514 to temperature sensor assembly 502 along sensor wires 506A and 506B. Upon reaching temperature sensor assembly 502, the modulated carrier signal transmits from the portions of sensor wires 506A and 506B coiled proximate RFID chip antenna 512 to RFID chip antenna 512 by induction across the small distance separating coiled portions of sensor wires 506A and 506B and RFID chip antenna 512. The modulated carrier signal conducts from RFID chip antenna 512 to RFID chip 510. In addition to containing an encoded request for configuration data, the modulated carrier signal also provides power to the RFID chip 510 so that RFID chip 510 can process the encoded request, remodulate the carrier signal to encode the requested configuration data and transmit the remodulated carrier signal to the coiled portions of sensor wires 506A and 506B by induction from RFID chip antenna 512. The remodulated carrier signal propagates from temperature sensor assembly 502 to temperature process transmitter 504 via sensor wires 506A and 506B to temperature antenna 514. Temperature antenna 514 transmits the remodulated carrier signal from temperature antenna 514 via RFID reader antenna 526 to RFID reader IC 524. RFID reader IC 524 demodulates the remodulated carrier signal and sends the configuration data to microprocessor 528, which stores the configuration data in local memory.

Once temperature process transmitter 504 has the configuration data for temperature sensor assembly 502, sensor element 508 senses temperature, creating an analog sensor signal. As illustrated in FIG. 5, sensor element 508 is a thermocouple type, thus the analog sensor signal is a change in voltage level across sensor element 508. The analog sensor signal conducts from temperature sensor assembly 502 to temperature process transmitter 504 via sensor wires 506A and 506B, unchanged by the coiled portions of sensor wires 506A and 506B. At temperature process transmitter 504, the analog sensor signal passes through sensor filter 518, which filters out high frequency interference, including any modulated carrier signals propagating on sensor wires 506A and 506B, and on to A/D converter 520. In addition, blocking capacitor 516 prevents temperature antenna 514 from shorting the analog sensor signal. A/D converter 520 converts the analog sensor signal to a digital sensor signal and sends it to microprocessor 528. Microprocessor 528 retrieves the configuration data from the local memory and adjusts the digital sensor signal, using the configuration data, to reflect an accurate temperature measurement.

The embodiment shown in FIG. 5 can also store and retrieve other types of temperature sensor assembly related digital information, beyond retrieving configuration data, because the digital communication is two-way.

In some applications, including low power current loop applications or wireless transmitter applications, RFID reader IC 526 requires more power than is available on a continuous basis. Power buffer 530 monitors available transmitter power and accumulates power exceeding that required for other operations of temperature process transmitter 504. Once sufficient power has been accumulated, power buffer 530 communicates this status to microprocessor 528. RFID reader IC 526 uses the accumulated power from power buffer 530 once microprocessor 528 initiates digital communication with temperature sensor assembly 502.

The inductively coupled antennae 514 and 526 in temperature process transmitter 504, as shown in FIG. 5, can include simple coiled wires separated by an air gap or an air-core transformer component. Such an arrangement is beneficial when it is necessary to galvanically isolate microprocessor 528 from sensor wires 506A and 506B. Alternatively, RFID reader IC 524 can be coupled directly to sensor wires 506A and 506B, while retaining blocking capacitor 516, if galvanic isolation is not necessary or if galvanic isolation is provided by other means.

Similarly, while the inductive coupling shown in FIG. 5 in temperature sensor assembly 502 is between RFID chip antenna 512 and portions of sensor wires 506A and 506B coiled proximate RFID chip antenna 512, this function could also be performed by an air-core transformer component in temperature sensor assembly 502. However, keeping the sensor wires 506A and 506B unbroken from sensor element 508 to temperature process transmitter 504, without passing through any electrical components, eliminates opportunities for degradation of the analog sensor signal.

Figure 6A:
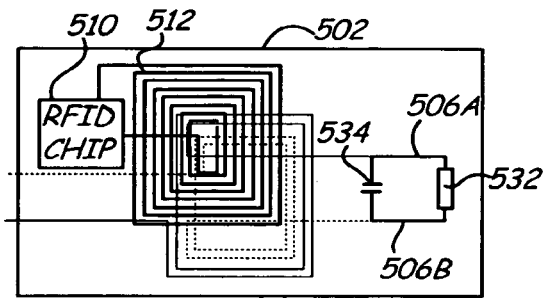
FIGS. 6A, 6B, and 6C are diagrams of temperature sensor assemblies using RFID circuits and 2-, 3-, and 4-wire RTDs.
Figure 6B:
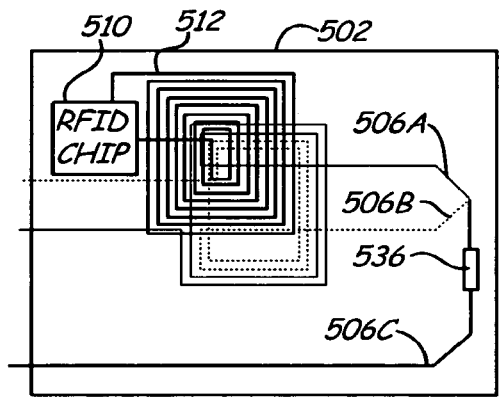
Figure 6C:
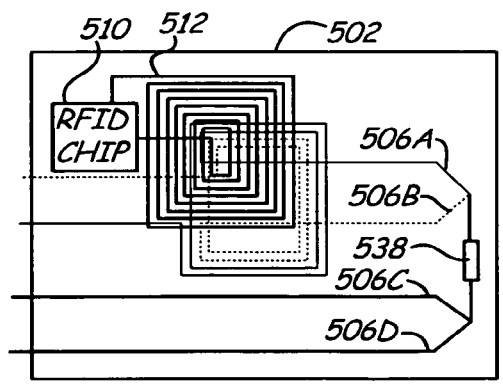

While FIG. 5 illustrates the invention using RFID circuits and a thermocouple type sensor element, 2-, 3-, and 4-wire RTDs may also be used. FIGS. 6A, 6B, and 6C are diagrams of temperature sensor assemblies using RFID circuits and 2-, 3-, and 4-wire RTDs. All components and operations in common with FIG. 5 are as described for FIG. 5.

FIG. 6A shows an embodiment of temperature sensor assembly, 502, using 2-wire RTD sensor element 532. This embodiment contains an additional component, high frequency bypass capacitor 534, in parallel with 2-wire RTD sensor element 532.

FIG. 6B shows an embodiment of temperature sensor assembly 502 using 3-wire RTD sensor element 536. Additional sensor wire 506C connects to one side of RTD sensor element 536 and sensor wires 506A and 506B connect to the other side. As in FIG. 5, sensor wires 506A and 506B propagate the modulated carrier signal, in addition to sending the analog sensor signal. Sensor wire 506C sends only the analog sensor signal.

FIG. 6C shows an embodiment of temperature sensor assembly 502 using 4-wire RTD sensor element 538. Additional sensor wires 506C and 506D connect to one side of RTD sensor element 538 and sensor wires 506A and 506B connect to the other side. As in FIG. 5, sensor wires 506A and 506B propagate the modulated carrier signal, in addition to sending the analog sensor signal. Sensor wires 506C and 506D send only the analog sensor signal.

Using antennae to inductively couple a modulated carrier signal with temperature sensor assembly electronics and with temperature process transmitter electronics, as shown in FIGS. 5 and 6A to 6C, provides for reading digital information from, and storing digital information in, a memory location on an RFID chip within a temperature sensor assembly while maintaining an accurate analog temperature sensor signal, without the use of wires separate from those carrying the sensor signal. This embodiment of the invention takes advantage of low cost, widely available RFID technology. However, by transmitting the modulated carrier signal over the sensor wires, the RFID signal propagates much farther than possible with conventional wireless RFID technology. This embodiment provides both two-way digital communication and an accurate analog sensor signal using only sensor wires for plug and play functionality.

Figure 7:
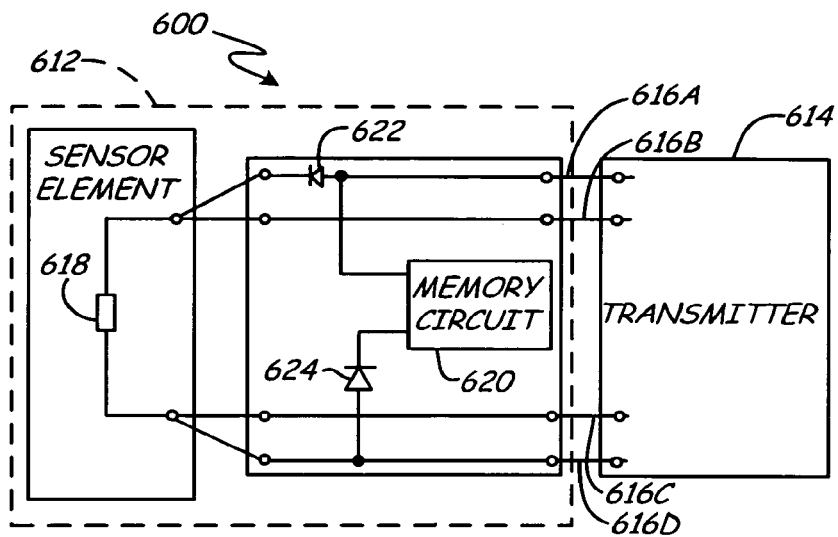
FIG. 7 is a diagram of a temperature sensor assembly compatible only with a 4-wire RTD.

FIG. 7 is a diagram showing an embodiment of the invention suitable only for 4-wire RTDs. This arrangement also provides for reading digital information from, and storing digital information in, a memory location within a temperature sensor assembly while maintaining an accurate analog temperature sensor signal, without the use of wires separate from those carrying the sensor signal. The digital information read or stored can be configuration data. This embodiment provides both two-way digital communication and an accurate analog sensor signal. However, in this embodiment, sensor measurement and sensor communication each take place only during separate modes of operation, a measurement mode and a communication mode, respectively.

FIG. 7 shows temperature sensor assembly/process transmitter 600, including temperature sensor assembly 612, temperature process transmitter 614, and sensor wires 616A to 616D. Temperature sensor assembly 612 further includes sensor element 618, memory circuit 620, sensor wire diode 622, and memory circuit diode 624. Sensor element 618 is a 4-wire RTD.

As shown in FIG. 7, temperature process transmitter 614 is connected to temperature sensor assembly 612 by sensor wires 616A to 616D. Memory circuit 620 is connected to sensor wire 616, between transmitter 614 and sensor wire diode 622. Memory circuit 620 is also connected to memory circuit diode 624 which is connected to sensor wire 616D. Sensor wires 616A and 616B are connected to one of two sides of sensor element 618. Sensor wires 616C and 616D are connected to the other of the two sides of sensor element 618.

During sensor measurement, temperature process transmitter 614 passes a constant current through sensor wire 616A, across sensor element 618, and back through sensor wire 616D. The voltage level drop across the resistance of sensor element 618 is a function of the temperature sensed. Sensor wires 616B and 616C measure the voltage drop across sensor element 618 and conduct this analog sensor signal measurement back to temperature process transmitter 614. Under these conditions, current flow through sensor wire diode 622 is unimpeded. Memory circuit diode 624 prevents any current flow across memory circuit 620 by stopping current flow from the higher voltage level in sensor wire 616A to the lower voltage level in sensor wire 616D. All four sensor wires 616A to 616D are able to perform their normal functions in a 4-wire RTD measurement.

During sensor communication, temperature process transmitter 614 reverses the polarity of the current flow. Sensor wire diode 622 prevents any current flow through sensing element 618 while memory circuit diode 624 allows current flow to memory circuit 620. Temperature process transmitter 614 can communicate with memory circuit 620 through sensor wires 616D and 616A without any influence from sensor element 618.

Memory circuit diode 624 must have a very low leakage current because any current leakage through memory circuit diode 624 during sensor measurement will result in a temperature measurement error. Memory circuit diode 624 may be a diode with very low leakage current or an N-JFET configured as a diode, with source and drain tied together. A N-JFET so configured is also a constant current diode, keeping the current flow relatively constant with changes in voltage.

Although the embodiment of FIG. 7 is suitable only for 4-wire RTDs, this arrangement does provide for reading digital information from, and storing digital information in, a memory location within a temperature sensor assembly while maintaining an accurate analog temperature sensor signal, without the use of wires beyond those normally used in a 4-wire RTD. This embodiment provides both two-way digital communication and an accurate analog sensor signal, during separate modes of operation: a communication mode and a sensor mode, respectively.

Figure 8:
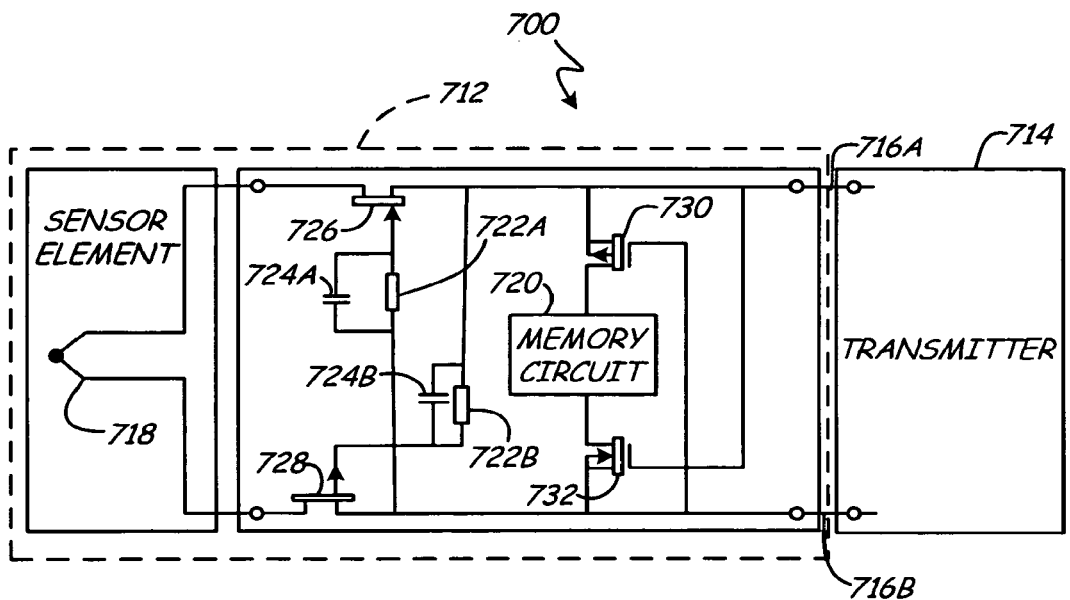
FIG. 8 is a diagram of a temperature sensor assembly compatible only with a thermocouple.

FIG. 8 is a diagram showing yet another embodiment of the invention, this one suitable only for use with thermocouples. This arrangement also provides for reading digital information from, and storing digital information in, a memory location within a temperature sensor assembly while maintaining an accurate analog temperature sensor signal, without the use of wires separate from those carrying the sensor signal. The digital information read or stored can be configuration data. This embodiment provides both two-way digital communication and an accurate analog sensor signal. Like the embodiment in FIG. 7, sensor measurement and sensor communication each take place only during separate modes of operation, a measurement mode and a communication mode, respectively.

FIG. 8 shows temperature sensor assembly/process transmitter 700, including temperature sensor assembly 712, temperature process transmitter 714, and sensor wires 716A and 716B. Temperature sensor assembly 712 further includes sensor element 718, memory circuit 720, resistors 722 A and 722B, speed-up capacitors 724A and 724B, n-channel JFET 726, p-channel JFET 728, p-channel MOSFET 730, and n-channel MOSFET 732. Both MOSFETs 730 and 732 are enhancement mode devices. Sensor element 718 is a thermocouple type sensor element.

As illustrated in FIG. 8, temperature process transmitter 714 is connected to temperature sensor assembly 712 by sensor wires 716A and 716B. Within temperature sensor assembly 712, memory circuit 720 is connected to sensor wires 716A and 716B by MOSFETs 730 and 732, respectively. The gates of MOSFETs 730 and 732 are connected to sensor wires 716B and 716A, respectively. Sensor element 718 is connected to sensor wires 716A and 716B by JFETs 726 and 728, respectively. The gate of JFET 726 is connected to sensor wire 716B by resistor 722A and speed-up capacitor 724A. The gate of JFET 728 is connected to sensor wire 716A by resistor 722B and speed-up capacitor 724B.

During sensor measurement, sensor element 718 generates a voltage level that changes relative to a sensed temperature. The voltage level is measured by temperature process transmitter 714 through conduction by sensor wires 716A and 716B. Conduction is unimpeded by JFETs 726 and 728 because voltage levels applied to the gates of JFETs 726 and 728 are insufficient to switch them off. Similarly, memory circuit 720 is not connected to sensor wires 716A and 716B because voltage levels applied to the gates of MOSFETs 730 and 732 are insufficient to switch them on.

During sensor communication, temperature process transmitter 714 applies a positive bias voltage to sensor wire 716A and a negative bias voltage to sensor wire 716B. The positive bias voltage of sensor wire 716A conducts through resistor 722B and speed-up capacitor 724B to shut off p-channel JFET 728. Similarly, the negative bias voltage of sensor wire 716B conducts through resistor 722A and speed-up capacitor 724A to shut off n-channel JFET 726. Use of speed-up capacitors 724A and 724B ensures that this switch happens very quickly, isolating sensor element 718 and preventing it from shorting the applied bias voltage. At the same time, the positive bias voltage of sensor wire 716A conducts to the gate of n-channel MOSFET 732 switching it on and the negative voltage bias of sensor wire 716, conducts to the gate of p-channel MOSFET 730 switching it on. With both MOSFETs 730 and 732 on, memory circuit 720 connects to temperature process transmitter 714 by sensor wires 716A and 716B. Temperature process transmitter 714 can communicate with memory circuit 720 through sensor wires 716A and 716B without any influence from sensor element 718.

The embodiment shown in FIG. 8 functions only with thermocouple-type sensor elements because the current flow is extremely low, resulting in virtually no voltage drop across the JFETs. In the case of RTDs, the higher current flow would result in sufficient series resistance to cause an unacceptable error in the resistance measurement.

Although the embodiment of FIG. 8 is suitable only for thermocouples, this arrangement does provide for reading digital information from, and storing digital information in, a memory location within a temperature sensor assembly while maintaining an accurate analog temperature sensor signal, without the use of wires beyond those normally used with thermocouples. This embodiment provides both two-way digital communication and an accurate analog sensor signal, during separate modes of operation, a communication mode and a sensor mode, respectively.

In the embodiments discussed above, memory circuits (which may include a microprocessor and separate nonvolatile memory) and other electrical circuits associated with temperature sensor assemblies may be contained within a single sensor assembly housing also containing a temperature sensor element. Alternatively, the memory and electrical circuits may be in a housing separate from a temperature sensor element housing, with the memory and electrical circuit housing attached anywhere along a length of sensor wires extending from the sensor element housing to a temperature process transmitter, where the memory and electrical circuit housing, the temperature sensor element housing, and the sensor wires together also comprise a temperature sensor assembly. In addition, although all embodiments discussed above include a single temperature sensor assembly connected to a temperature process transmitter, it is understood that the invention includes multiple temperature sensor assemblies connected to a single temperature process transmitter through multiplexing.

While all embodiments discussed above use temperature as the process variable to be measured, the invention is applicable to the measurement of other process variables, including pressure, pH, and flow rate.

The present invention provides automatic loading of the configuration data for a sensor assembly into a process transmitter without the use of additional wiring, bringing true plug-and-play functionality to the field of process instrumentation. Further, the invention can also store and retrieve other types of sensor assembly related information, beyond retrieving configuration data, because the digital communication is two-way. Other types of sensor assembly related information includes revised calibration coefficients, hours of use, and installation date.

The greatest benefits of the invention are realized when sensor assemblies attach to process transmitters where both incorporate the invention. However, another advantage of the invention arises from the unique feature that only conventional sensor wiring is needed: sensor assemblies incorporating the invention also work as normal sensor assemblies when connected to process transmitters that do not incorporate the invention. Conversely, process transmitters incorporating the invention can accept as inputs sensor assemblies that do not incorporate the invention. In such cases, there is no digital communication over the sensor wires, and consequently no automatic configuration of the transmitter, but the sensor assembly/process transmitter combinations will function as conventional sensor assembly/process transmitters, providing analog sensor signals and producing measurement results once manually configured. This is a useful advantage where a component incorporating the invention (or not) fails and must be replaced, but only a component without the invention (or with) is immediately available. This interchangeability serves to eliminate process downtime associated with waiting for an exact replacement component.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A process instrument comprising:
 a sensor assembly including:
  sensor wires;
  a sensor element conductively connected to the sensor wires so as to transmit, without amplification or signal processing, an analog sensor signal indicative of a process parameter sensed by the sensor element;
  memory circuitry having configuration data related to the sensor assembly; and
  interface circuitry electrically connected to the memory circuitry and reactively coupled to the sensor wires so as to transmit, over the sensor wires, a digital communication signal indicative of the configuration data; and
 a process transmitter including:
  sensor measurement circuitry conductively connected to the sensor wires so as to receive, over the sensor wires, the analog sensor signal, the sensor measurement circuitry configured to convert the received analog sensor signal to a digital sensor signal;
  sensor communication circuitry reactively coupled to the sensor wires so as to receive, via the sensor wires, the digital communication signal indicative of the configuration data;
  a microprocessor electrically connected to the sensor measurement circuitry so as to receive the digital sensor signal and electrically connected to the sensor communication circuitry so as to receive the digital communication signal indicative of the configuration data, the microprocessor configured to calculate, based on the received digital sensor signal and the configuration data, a calibrated measurement value indicative of the process parameter; and
  communication circuitry electrically connected to the microprocessor and configured to transmit an output signal representative of the calibrated measurement value.

2. The process instrument of claim 1, wherein the interface circuitry of the sensor assembly is inductively coupled to the sensor wires.

3. The process instrument of claim 1, wherein the interface circuitry of the sensor assembly is capacitively coupled to the sensor wires.

4. The process instrument of claim 1, wherein the interface circuitry of the sensor assembly comprises:
 a modulator conductively connected to the memory circuitry and reactively coupled to the sensor wires and configured to receive, from the memory circuitry, the configuration data related to the sensor assembly and to transmit, over the sensor wires, the digital communication indicative of the configuration data.

5. The process instrument of claim 1, wherein the digital communication signal is a first digital communication signal, the interface circuitry of the sensor assembly further comprising:
 a demodulator conductively connected to the memory circuitry and reactively coupled to the sensor wires so as to receive, over the sensor wires, a second digital communication signal containing instructions.

6. The process instrument of claim 1, wherein the microprocessor of the process transmitter is a first microprocessor, the memory circuitry of the sensor assembly further comprising:
 nonvolatile memory;
 a second microprocessor in electrical communication with both the nonvolatile memory and the interface circuitry, the second microprocessor configured to execute the instructions contained in the second digital communication signal, and to store and/or retrieve, in response to the received instructions, information to and/or from the nonvolatile memory, respectively.

7. The process instrument of claim 1, wherein the interface circuitry of the sensor assembly comprises:
a rectifier/power buffer that provides, using the digital communication, power to the interface circuitry and/or memory circuitry.

8. The process instrument of claim 1, wherein the memory circuitry and the interface circuitry of the sensor assembly comprise a radio-frequency identification (RFID) chip.

9. The process instrument of claim 1, wherein the sensor element of the sensor assembly comprises a temperature sensing element.

10. The process instrument of claim 1, wherein the sensor element of the sensor assembly comprises a thermocouple.

11. The process instrument of claim 1, wherein the sensor element of the sensor assembly comprises a Resistive Temperature Device (RTD).

12. The process instrument of claim 1, wherein the sensor assembly further comprises:
a bypass capacitor electrically connected across the sensor element.

13. The process instrument of claim 1, wherein the interface circuitry of the sensor assembly is reactively coupled to the sensor wires via a transformer having a first winding formed by the sensor wires.

14. The process instrument of claim 13, wherein the first winding formed by the sensor wires is in series with the sensor element.

15. The process instrument of claim 13, wherein the first winding formed by the sensor wires is in parallel with the sensor element.

16. A sensor assembly for use with a process transmitter, the sensor assembly comprising:
sensor wires;
a sensor element directly and conductively connected to the sensor wires so as to transmit, over the sensor wires and without amplification and without signal processing, an analog sensor signal indicative of a process parameter sensed by the sensor element;
memory circuitry having configuration data related to the sensor assembly; and
interface circuitry electrically connected to the memory circuitry and reactively coupled to the sensor wires so as to transmit, over the sensor wires, a digital communication signal indicative of the configuration data.

17. The sensor assembly of claim 16, wherein the interface circuitry is inductively coupled to the sensor wires.

18. The sensor assembly of claim 16, wherein the interface circuitry is capacitively coupled to the sensor wires.

19. The sensor assembly of claim 16, wherein the interface circuitry comprises:
a modulator conductively connected to the memory circuitry and reactively coupled to the sensor wires and configured to receive, from the memory circuitry, the configuration data related to the sensor assembly and to transmit, over the sensor wires, the digital communication indicative of the configuration data.

20. The sensor assembly of claim 16, wherein the digital communication signal is a first digital communication signal, the interface circuitry further comprising:
a demodulator conductively connected to the memory circuitry and reactively coupled to the sensor wires so as to receive, over the sensor wires, a second digital communication signal containing instructions.

21. The sensor assembly of claim 16, further comprising:
nonvolatile memory;
a microprocessor in electrical communication with both the nonvolatile memory and the interface circuitry, the microprocessor configured to execute the instructions contained in the second digital communication signal, and to store and/or retrieve, in response to the received instructions, information to and/or from the nonvolatile memory, respectively.

22. The sensor assembly of claim 16, wherein the interface circuitry comprises:
a rectifier/power buffer that provides, using the digital communication signal, power to the interface circuitry and/or memory circuitry.

23. The sensor assembly of claim 16, wherein the memory circuitry and the interface circuitry comprise a radio-frequency identification (RFID) chip.

24. The sensor assembly of claim 16, wherein the sensor element comprises a temperature sensing element.

25. The sensor assembly of claim 16, wherein the sensor element comprises a thermocouple.

26. The sensor assembly of claim 16, wherein the sensor element comprises a Resistive Temperature Device (RTD).

27. The sensor assembly of claim 16, further comprising:
a bypass capacitor electrically connected across the sensor element.

28. The sensor assembly of claim 16, wherein the interface circuitry is reactively coupled to the sensor wires via a transformer having a first winding formed by the sensor wires.

29. The sensor assembly of claim 28, wherein the first winding formed by the sensor wires is in series with the sensor element.

30. The sensor assembly of claim 28, wherein the first winding formed by the sensor wires is in parallel with the sensor element.

31. A process transmitter for use with a sensor assembly having sensor wires, the process transmitter comprising:
sensor measurement circuitry configured to conductively connect to the sensor wires so as to receive, over the sensor wires, an analog sensor signal, the sensor measurement circuitry further configured to convert the received analog sensor signal to a digital sensor signal;
a radio-frequency identification (RFID) chip configured to reactively couple to the sensor wires so as to receive, via the sensor wires, a digital communication signal indicative of configuration data of the sensor assembly,
a microprocessor electrically connected to the sensor measurement circuitry so as to receive the digital sensor signal and electrically connected to the RFID chip so as to receive the digital communication signal indicative of the configuration data, the microprocessor configured to calculate, based on the received digital sensor signal and the configuration data, a calibrated measurement value indicative of a process parameter; and
a communication port electrically connected to the microprocessor and configured to transmit an output signal representative of the calibrated measurement value.

* * * * *